US005356523A

United States Patent [19]

Vannucci et al.

[11] Patent Number: 5,356,523

[45] Date of Patent: Oct. 18, 1994

[54] METHOD OF MAKING LINBO$_3$ CHANNEL OPTICAL GUIDES

[75] Inventors: Antonello Vannucci; Mauro Varasi, both of Rome, Italy

[73] Assignee: Alenia Aeritalia & Selenia S.p.A., Rome, Italy

[21] Appl. No.: 882,146

[22] Filed: May 11, 1992

[30] Foreign Application Priority Data

May 10, 1991 [IT] Italy ........................ RM91 A 000316

[51] Int. Cl.$^5$ .......................... C23C 14/34; G03C 5/00

[52] U.S. Cl. ................................ 204/192.23; 427/162; 430/321

[58] Field of Search ....................... 204/192.15, 192.23, 204/192.26, 192.27, 192.28; 427/162, 164; 385/130, 132; 430/321

[56] References Cited

U.S. PATENT DOCUMENTS 4,561,718 12/1985 Nelson ............................ 385/132 X
4,775,208 10/1988 Robinson et al. ............... 385/132 X
4,938,836 7/1990 Carenco et al. ................. 385/130 X
4,978,437 12/1990 Wirz ............................ 204/192.26 X
4,983,499 1/1991 Suzuki et al. .................... 427/162 X
5,018,809 5/1991 Shin et al. ................... 204/192.26 X
5,018,811 5/1991 Haavisto et al. ..................... 385/130
5,062,688 11/1991 Okuda et al. .................... 385/130 X

*Primary Examiner*—Nam Nguyen
*Attorney, Agent, or Firm*—Herbert Dubno

[57] ABSTRACT

A manufacturing process for high performance single mode channel optical guides of the LiNbO$_3$ using five successive steps: photo-etched optical path definition, deposition of the dielectric layer, lift-off definition of the channels, proton exchange and thermal cycling. The method can be used to produce multi-function devices to be interfaced with optical fibers to obtain sensors, telecommunications devices and devices for processing wide-band microwave signals the proton exchange is affected in benzoic acid diluted with lithium benzoate and eliminates the time instability of the electro-optical structure due to the presence of an insulating layer above the optical guide.

1 Claim, 2 Drawing Sheets

10 15 12 11 14 13

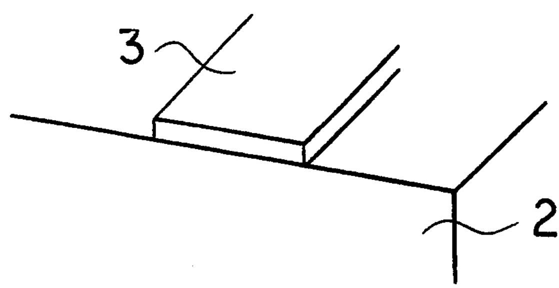
FIG.1.1
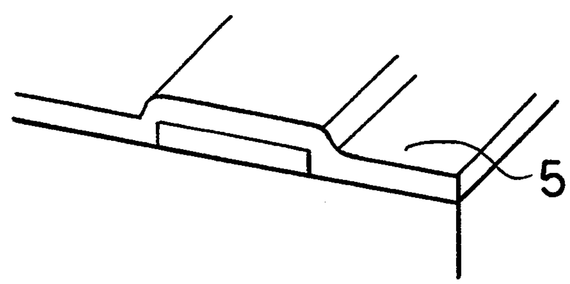
FIG.1.2
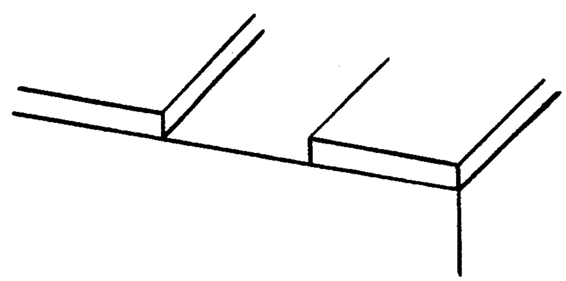
FIG.1.3
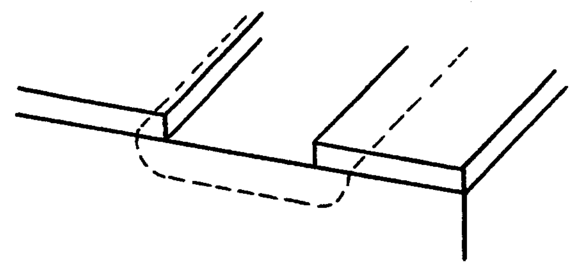
FIG.1.4
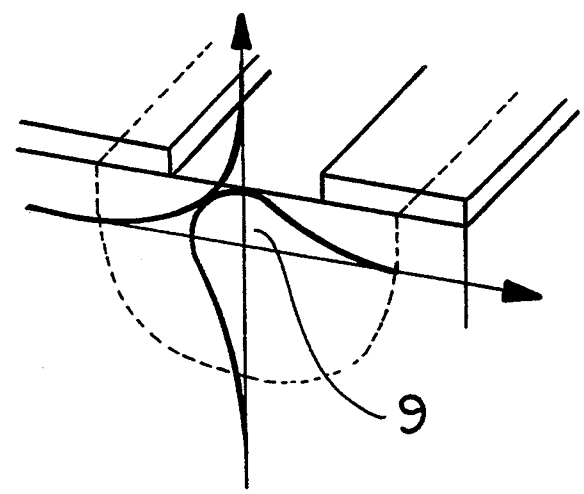
FIG.1.5

METHOD OF MAKING $LINBO_3$ CHANNEL OPTICAL GUIDES

FIELD OF THE INVENTION

This invention relates to a new manufacturing process for lithium niobate channel optical guides, obtained in particular on its 'X' cut surface, where a thin dielectric film, within which the channel is defined by photo etching, is used as a template while manufacturing the optical guide and as an insulating film between this guide and the metal electrodes, resulting in a self-aligning process.

BACKGROUND OF THE INVENTION

The process of the invention pertains to the field of planar integrated optical component technologies and can advantageously be applied to the manufacturing of components used for optical fiber sensors (Reference #1: W. C. Gross et al, Applied Optics, Vol. 19, #6, page 852–858, 198) and for wide band microwave signal processing (Reference #3: T. Sueta and M. Izutsu, IEEE Trans on microwave Theory and Techniques, Vol. 38, #5, page 477–482, May 1990).

It is a known fact that previously the manufacturing of channel optical guides when in particular meant for phase modulators based upon lithium niobate electro-optical effects, suffered from the following drawbacks:

complexity of the manufacturing process, constancy of the electro-optical characteristics of the material within which the optical guide is manufactured (Reference #4: R. A. Becker, Appl. Phys. Lett., vol. 43, page 131–133, 1983).

elimination of the optical and electro-optical characteristics of the device (Reference #5: J. L. Jackel and C. E. Rice, "Proceedings of Guided Wave Optoelectronic Material", SPIE vol. 460, page 43–48, 1984).

The manufacturing of $LiNbO_3$ channel optical guides most commonly uses the diffusion of titanium into the lithium niobate crystal (Ref. #6: W. K. Burns et al., J. Appl. Phis., Vol. 50, #10; [page 6175–6182, Oct. 1979) and of the following deposition of a dielectric film followed by the deposition and definition of the metal electrodes.

This process is costly in terms of deposition and definition of the titanium film (complex high accuracy equipment being required to determine the thickness of the film) and of the following thermal diffusion of titanium into the crystal (temperature control at about 1000° C.).

The proton exchange in acid solution between Li (li+O) of the crystal and the solution protons (H+) (has made it possible to cut the complexity of the manufacturing process to a very large degree (REF. #7: K. K. Wong, Spie, Vol. 993 "Integrated Optical Circuit Eng VI" page 13–25, 1988), but had the drawback of a reduced electro-optical efficiency of the devices. Eventually, the presence of the dielectric film above the optical guide, independently from its manufacturing process, gives rise to an instability of the modulator electro-optical characteristics. To eliminate this effect, the dielectric film must be removed above the optical guide (Ref #8: Yamada et al, Japan J. Appl. Phys. vol. 20, #4, page 733–737, Apr. 1981).

OBJECT OF THE INVENTION

It is the object of this invention to provide a method of making an L: $NbO_3$ optical device characterized by:

simplification of the manufacturing process, no modification of the electro-optical efficiency, and elimination of the electro-optical instability characteristics.

SUMMARY OF THE INVENTION

This object is made possible by the adoption of a template in the proton exchange process, which consists of a dielectric film which is deposited onto the surface and which carries the optical guide channel and also by the thermal treatment which follows the exchange phase.

The dielectric film fulfills with one action both the function of proton exchange template and the function of an insulating layer between the optical guide and the metal electrodes which are later applied. At the same time, the resulting isolation layer is not present above the optical guide, so as to eliminate the causes of instability of the electro-optical characteristics of the modulator.

BRIEF DESCRIPTION OF THE DRAWING

The above and other objects, features, and advantages of the present invention will become more readily apparent from the following description, reference being made to the accompanying drawing in which:

FIGS. 1.1 to 1.5 are diagrammatic perspective views showing successive steps in a process according to the invention.

SPECIFIC DESCRIPTION

Figure 2:
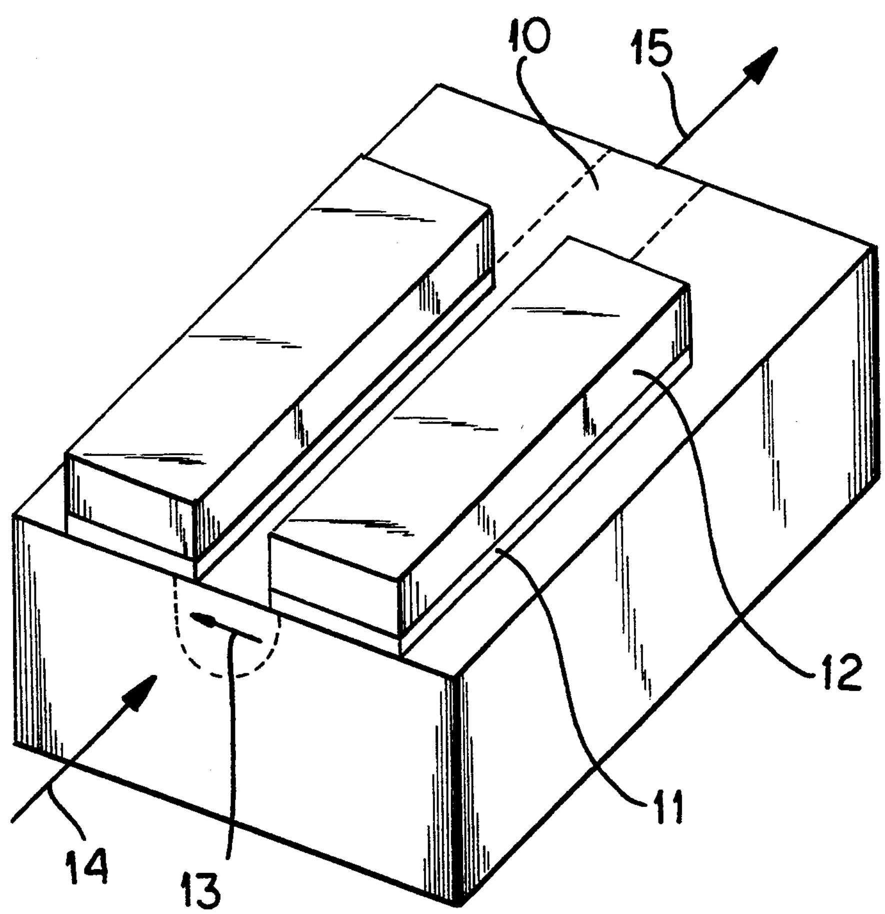
FIG. 2 is a perspective view of the electro-optical device.

In FIGS. 1.1 to 1.5, the product 1 of the first stage of the process has a photo-etched structure on an "x"-cut $LiNbO_3$substrate 2 using a polymethylmethacrylate photopolymer 3 and deep UV radiation to define the profile, so that the product 1 is the result of the photo-etched definition with the polymer.

Upon the application of an $SiO_2$ layer to the product 1, we obtain the intermediate product 4 (FIG. 1.2) which can be subjected to lift-off of the polymer to open a channel in the dielectric ($SiO_2$) film (intermediate product 6 of FIG. 1.3). In this channel, the proton exchange is then effected (yielding the intermediate product 7, FIG. 1.4) and the latter product is then subjected to the thermal treatment (FIG. 1.5) to give the product 8 with a refractive index profile as shown at 9.

FIG. 2 shows an electro-optical modulator fabricated in accordance with the invention and comprising an optical guide 10 flanked by the insulating layer 11 on which metal electrodes 12 are provided. The electric field 13 is represented by a solid arrowhead and the optical radiation input by the hollow head arrow 14. The phase-modulated optical radiation output is represented at 15.

The sequence of phases of the manufacturing process of the optical guide and of the insulating layer is represented in:

a) Photo-etch definition in the X cut of an $LiNbO_3$. crystal 2 via a PMMA structure (polymethylmethacrylate) to yield the photoetched channel 3 which is 500 nm thick corresponding to the channel left free by the dielectric layer and through which the exchange will be later effected (FIG. 1.1).

b) Deposition by magnetron sputtering in an oxidizing environment (RF power density at the cathode of 3 W/cm2, partial pressure of Argon=2>10−3 Torr, partial pressure Oxygen: $1\times10^{-3}$ Torr) of a silicon dioxide ($SiO_2$) film 5 200 nm thick to yield the intermediate structure 4 (FIG. 1.2).

c) Removal of the $SiO_2$ layer from the channel by polymer lift-off by immersion in a solvent (acetone) to yield the intermediate product 6) (FIG. 1.3).

d) Proton exchange in 1% benzoic acid with lithium benzoate (temperature of the solution +235° C., duration of the exchange 35 minutoc) through the template formed by the silicon dioxide layer to yield the intermediate product 7 (FIG. 1.4).

e) Thermal treatment for interdiffusion of the protons present in the layer exchanged and the lithium atoms present in the crystal regions close to this layer (temperature 350° C. in oxygen, duration 50 minutes) yielding the final product 8 (FIG. 1.5).

At the end of the process, outlined above, an increase of the refractive index in the interdiffused Li-H area is obtained, which makes possible the restriction of the laser optical radiation to 830 nm, resulting in a single mode optical guide for TE polarization. At the same time, the optical guide is self aligned with a channel defined in a dielectric layer which is used as an isolation layer between it and the electrodes of a generic modulator which is shown as the elementary structure in FIG. 2.

The elementary modulator presently preferred by the inventors has the following characteristics:

in-guide optical propagation loss +1 dB/cm, coupling loss with a polarization conservation fiber 0.4 dB, voltage required to introduce a phase delay of the optical radiation equal to 0.5 wavelengths =1.4 Volt. The main advantages of the process described are the following:

The optical guide and the isolating film between the guide and the metal electrodes are obtained in a self-lining method by using a layer of silicon dioxide as a template for the proton exchange process.

The presence of the insulating dielectric layer above the guide is eliminated, solving the problem of time instability of the electro-optical structure, known as DC drift, caused by the presence of the insulating layer even above the guide.

The electro-optical efficiency characteristics of the LiNbO3 crystal are not affected by the process.

We claim:

1. A method of making an electro-optical device having at least one single mode optical guide channel, comprising the steps of:

(a) applying a polymethylmethacrylate photopolymer to an "x"-cut $LiNbO_3$ crystal and photoetching th ephotopolymer with deep ultraviolet radiation to define a channel profile in said photopolymer, thereby forming an "x"-cut $LiNbO_3$ substrate with a photopolymer strip thereon extending along said channel profile;

(b) depositing an $SiO_2$ layer on said substrate covering said strip by magnetron sputtering in an oxidizing environment of argon and oxygen;

(c) removing said $SiO_2$ layer along said channel by lifting off said strip of said photopolymer by immersion in acetone;

(d) effecting a proton exchange with said substrate along said channel where said $SiO_2$ layer has been lifted off in step (c) in dilute benzoic acid with lithium benzoate to modify optical properties of said substrate along said channel;

(e) thermally treating said substrate in an oxygen atmosphere to effect interdiffusion of protons in an exchange layer along said channel with lithium atoms present in said substrate close to said layer, thereby forming in said substrate at least one single mode optical guide channel having a refractive index profile with a peak at a center line of said channel; and (f) applying metal electrodes to said $SiO_2$ layer along opposite longitudinal sides of said channel.

* * * * *